(No Model.)

W. H. McWILLIAMS.
BEE FEEDER.

No. 357,493. Patented Feb. 8, 1887.

Witnesses,
Robert Errett.
Geo. W. Rea

Inventor:
Wright H. McWilliams,
By James L. Norris
Atty.

UNITED STATES PATENT OFFICE.

WRIGHT H. McWILLIAMS, OF WACO, TEXAS.

BEE-FEEDER.

SPECIFICATION forming part of Letters Patent No. 357,493, dated February 8, 1887.

Application filed June 8, 1886. Serial No. 204,514. (No model.)

*To all whom it may concern:*

Be it known that I, WRIGHT H. McWILLIAMS, a citizen of the United States, residing at Waco, in the county of McLennan and State of Texas, have invented new and useful Improvements in Bee-Feeders, of which the following is a specification.

This invention relates to an improved construction of bee-feeders; and it consists of a vertically-oblong box or case open on one side, at the bottom, and having a rectangular basin or trough projecting in front of said opening and lateral attaching flanges or wings, as hereinafter set forth.

Figure 1:
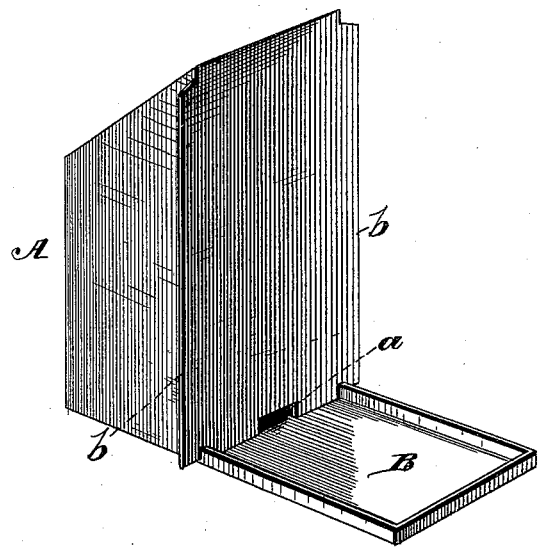
Figure 2:
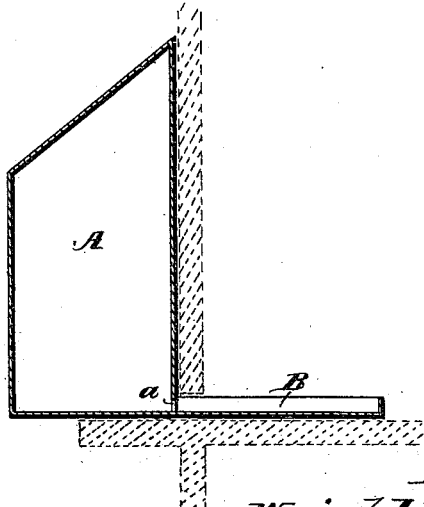

In the annexed drawings illustrating the invention, Figure 1 is a perspective view of my improved bee-feeder. Fig. 2 is a sectional view of a portion of a bee-hive with the feeder in position.

The letter A designates a vertically oblong or rectangular box or case—say about six inches high, five inches wide, and two inches from front to rear.

At the bottom of the case or box A on one of its wide sides is a transverse opening, $a$, extending partly or entirely across the lower part of the case or box and about one-eighth of an inch in height. The bottom of the case or box A is projected horizontally—say four inches, more or less—in front of the opening $a$, and is provided with flanged sides, thereby forming a shallow trough or basin, B, for holding the food.

The bee-feeder constructed as above described may be made of tin or other suitable material. It is attached to the hive by passing the horizontal portion or basin B through the hive-entrance or through other suitable openings in the hive, the box or case A being provided on each side with a laterally-projecting wing or flange, $b$, for engagement with a button on the hive, thus holding the feeder in place.

Food is placed in the box or case A by withdrawing said box from the hive and turning it backward to give ready access to the opening $a$, through which food can be introduced by using any small-lipped vessel that will pour a small stream and allow the air to escape as the food goes in. This construction allows the supply of food to be readily replenished without risk of injury to the occupants of the hive and also affords a safeguard against the depredation of intruding insects.

I am aware that a bee-feeder has heretofore been made with an air-tight upper portion or body provided with a stoppered aperture in its bottom, through which the food-supply is introduced and having at the bottom of its front a narrow aperture which opens into a trough attached to the lower part of the bee-feeder body, said bee-feeder being removably supported in a holder which is rigidly attached to the bottom of the hive and forms the rear end of the brood-chamber. This, however, I do not claim.

What I claim is—

A bee-feeder composed of the vertically-oblong box or case A, having an opening, $a$, in one side of its lower end, a trough or basin, B, projecting in front of said lower opening, and lateral attaching flanges or wings $b$, $b$, substantially as described.

In testimony whereof I affix my signature in presence of two witnesses.

WRIGHT H. McWILLIAMS.

Witnesses:
WM. M. FLOURNOY,
E. A. McKENNEY.